United States Patent
Wang et al.

(10) Patent No.: US 7,394,481 B2
(45) Date of Patent: Jul. 1, 2008

(54) METHOD FOR REALIZING MULTI-PICTURE

(75) Inventors: Jing Wang, Shenzhen (CN); Xiaorong Wang, Shenzhen (CN); Xiaoxia Wei, Shenzhen (CN); Ge Guo, Shenzhen (CN)

(73) Assignee: Huawei Technologies Co., Ltd., Longgang District, Shenzhen, Guangdong Province (CN)

( * ) Notice: Subject to any disclaimer, the term of this patent is extended or adjusted under 35 U.S.C. 154(b) by 269 days.

(21) Appl. No.: 10/565,084

(22) PCT Filed: Jul. 15, 2004

(86) PCT No.: PCT/CN2004/000809

§ 371 (c)(1),
(2), (4) Date: Jan. 17, 2006

(87) PCT Pub. No.: WO2005/009038

PCT Pub. Date: Jan. 27, 2005

(65) Prior Publication Data

US 2006/0209206 A1    Sep. 21, 2006

(30) Foreign Application Priority Data

Jul. 19, 2003  (CN)  ................................ 03 1 78396

(51) Int. Cl.
*H04N 7/15* (2006.01)
(52) U.S. Cl. ................................. 348/14.09; 348/14.08
(58) Field of Classification Search .............. 348/14.09, 348/14.08, 14.12
See application file for complete search history.

(56) References Cited

U.S. PATENT DOCUMENTS

| 5,453,780 | A | 9/1995 | Chen et al. ..................... 348/15 |
| 6,456,335 | B1 | 9/2002 | Miura et al. ................ 348/588 |
| 6,956,600 | B1 * | 10/2005 | Gaylord .................. 348/14.08 |

FOREIGN PATENT DOCUMENTS

| CN | 1422079 | 6/2003 |
| JP | 10-164539 | 6/1998 |

* cited by examiner

*Primary Examiner*—Stella L Woo
(74) *Attorney, Agent, or Firm*—Ladas & Parry, LLP

(57) ABSTRACT

A method for realizing multi-picture, including: A. Multi-point Control Unit (MCU) creates an indicator containing multi-picture information for each of the terminals and sends the indicators to the terminals; B. each terminal receives the indicator, encodes a source picture depending on the information in the multi-picture information indicator, and inserts said multi-picture information indicator into a sub-bitstream and transmits the sub-bitstream to the MCU; C. when receiving the sub-bitstreams from the respective terminals, the MCU combines the sub-bitstreams into a composite bitstream and sends the composite bitstream to a display terminal; D. the display terminal receives the composite bitstream, extracts the sub-bitstreams from the composite bitstream, and decodes the sub-bitstreams depending on the multi-picture information indicators of the sub-bitstreams and combines the decoded sub-pictures into a multi-picture output. The present invention reduces the cost and greatly enhances multi-picture transmission and combination capability thus to implement transmission and combination of sub-pictures.

8 Claims, 2 Drawing Sheets multi-picture mode sub-picture number

METHOD FOR REALIZING MULTI-PICTURE

FIELD OF THE INVENTION

The present invention relates to multimedia videoconferencing techniques, in particularly to a method for realizing multi-picture.

BACKGROUND OF THE INVENTION

A video conference usually involves multiple parties. In the past, only the picture of one of the rest parties in the video conference could be seen by the local party because multi-picture technique was unavailable, which degraded intuitiveness of the video conference to a certain extent and made any party in the video conference feel that the communication with all other parties was not face-to-face. Therefore, it is very important to implement multi-picture technique that enables display of pictures of multiple parties on a display screen, in order to improve the performance of videoconferencing and meet the users' demand.

In the prior art, the multi-picture transmission solution usually includes either of the following two methods:

Method 1: First, the Multipoint Control Unit (MCU) decodes video bitstreams from each terminals to obtain the corresponding multiple channels of decoded pictures; second, the decoded pictures are scaled to appropriate sizes and combined together; next, the combined picture is encoded and the resulting bitstream is transmitted to a terminal; finally, the terminal decodes the combined picture bitstream and the decoded pictures are the multi pictures.

Method 2: The MCU performs multiplexed transmission of the multiple channels of video bitstreams on the basis of Continuous Presence Multipoint and Video Multiplex (CPM), which is a multi-picture solution proposed by H.263 Standard. In this method, each of the sub-bitstreams encoded by the respective terminals involved in multi-picture combination is assigned with a unique indicator, which is abbreviated as "SBI" (Sub-Bitstream Indicator) used to distinguish between sub-bitstreams, and inserted into the picture header or the header of Group of Blocks (GOB) of the sub-bitstream.

In the second method, the MCU does not decode the video sub-bitstreams; instead, it only combines the sub-bitstreams in units of GOBs or frames to form a multi-channel composite bitstream; when receiving the multi-channel composite bitstream, the terminals distinguish between the respective channels of sub-bitstreams in the composite bitstream according to the SBIs in the picture headers or the GOB headers and then decode the channels of sub-bitstreams respectively, and finally display the pictures decoded from the sub-bitstreams in combination, thus to obtain the multi-picture.

However, the above methods in the prior have many drawbacks as follows:

Though the first method can implement combination of multiple sub-pictures, it is highly costly and consumes resources e.g. operation capability and memory severely at the MCU side. Though the second method costs less, the SBI can only represent four different values for a binary algorithm, as said SBI only consists of two bits as specified in syntax of H.263; therefore, the second method can only supports a combination of four channels of bitstreams at the most, i.e., a combination of four sub-pictures.

SUMMARY OF THE INVENTION

The present invention provides a method of realizing multi-picture, so as to overcome the challenge of implementing multi-picture for more than four channels at a low cost in the prior art.

To solve the above problem, the present invention provides a technical proposal as follows:

A method of realizing multi-picture, comprising the following steps:

A. the MCU creates an indicator containing multi-picture information for each of the terminals and sends the indicator to each of the terminals;

B. each of the terminals receives the indicator, encodes a source picture depending on the information in the multi-picture information indicator, and inserts said multi-picture information indicator into a sub-bitstream and transmits the sub-bitstream to the MCU;

C. when receiving the sub-bitstreams from the respective terminals, the MCU combines the sub-bitstreams into a composite bitstream and sends the composite bitstream to a display terminal;

D. the display terminal receives the composite bitstream, extracts the respective sub-bitstreams from the composite bitstream, decodes the sub-bitstreams depending on the multi-picture information indicator of the sub-bitstreams, and combines the decoded sub-pictures into a multi-picture output.

Wherein said indicator refers to an Extended Sub-Bitstream Indicator (ESBI) containing information of multi-picture mode, positions, dimensions, and formats of the sub-pictures.

More specifically, the inserting of the multi-picture information indicator into the sub-bitstream in said step B refers to that: when the MCU combines the sub-bitstreams in units of frames, the multi-picture information indicator is inserted into the picture header of the sub-bitstream; when the MCU combines the sub-bitstreams in units of GOBs, the multi-picture information indicator is inserted into both the picture header and the GOB header of the sub-bitstream; when the MCU combines the sub-bitstreams in units of Slices, the multi-picture information indicator is inserted into both the picture header and the Slice header of the sub-bitstream.

Specifically, the encoding of the source picture depending on the information in the multi-picture information indicator in said step B refers to that: the source picture is encoded depending on the sub-picture dimension and format information contained in the multi-picture information indicator.

More specifically, the combining into the composite bitstream in said step C refers to combining into the composite bitstream in units of frames, GOBs or Slices.

More specifically, the extracting of the sub-bitstreams in said step D refers to extracting the respective sub-bitstreams in units of frames, GOBs or Slices.

More specifically, the dependence on the multi-picture information indicator of the respective sub-bitstreams in said step D refers to that: when the MCU combines the sub-bitstreams in units of frames, it is depending on the multi-picture information indicators in the picture headers of the sub-bitstreams; when the MCU combines the sub-bitstreams in units of GOBs, it is depending on the multi-picture information indicators in the picture headers and the GOB headers of the sub-bitstreams; when the MCU combines the sub-bitstreams in units of Slices, it is depending on the multi-picture information indicators in the picture headers and the Slice headers of the sub-bitstreams.

In the present invention, through extending the CPM/SBI Syntax proposed in H.263, the multi-picture information indicator is lengthened so as to carry more information; thereby, the MCU can implement transmission and combined display of as many sub-picture bitstreams as possible without decoding or recoding the video bitstreams, and the decoding and the combining of the sub-pictures are completely done at the terminals. The advantage of the present invention is: on the one hand it reduces the cost, and on the other hand it greatly enhances multi-picture transmission and combination capability thus to implement transmission and combination of as many sub-pictures as possible.

DETAILED DESCRIPTION OF THE EMBODIMENTS

Figure 1:
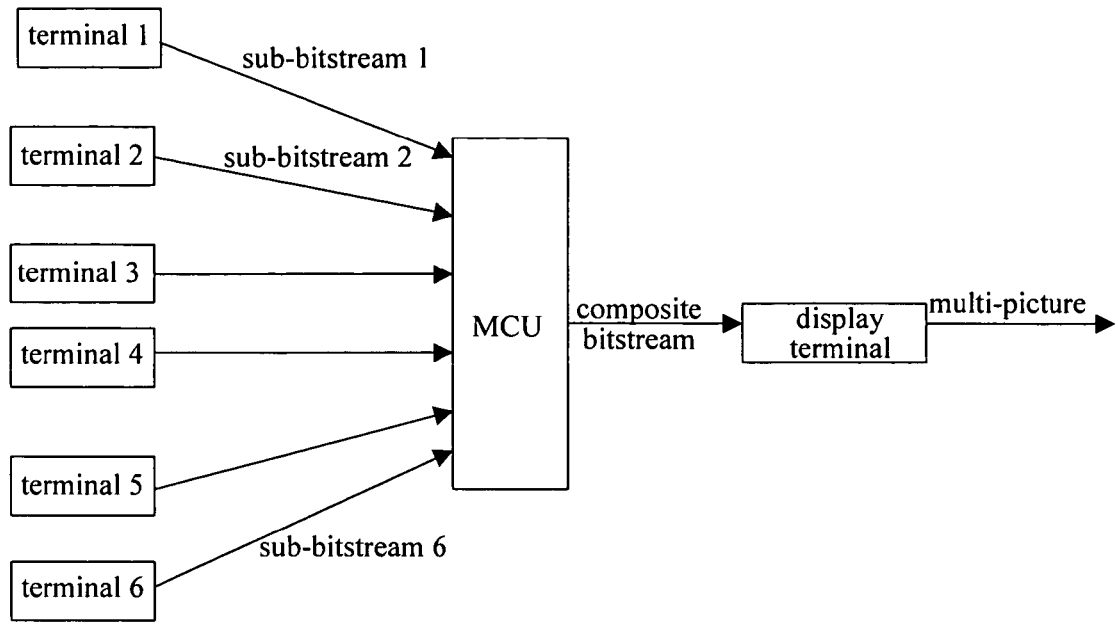
FIG. 1 is a schematic diagram of system architecture according to an embodiment of the present invention.

As shown in FIG. 1, the system according to an embodiment of the present invention is a H.320 and H.323-based videoconference system that is widely used presently, which videoconference system consists of six terminals, one MCU, and one display terminal, connected through transmission network such as Integrated Services Digital Network (ISDN) or Local Area Network (LAN) etc. This videoconference system is required to transmit the sub-pictures from the six terminals through the MCU and output a combined multi-picture on the display terminal.

Figure 2A:
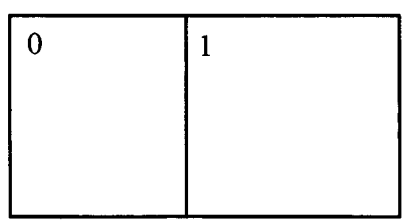
FIG. 2A is a schematic diagram of two-picture mode of terminal display according to an embodiment of the present invention.
Figure 2B:
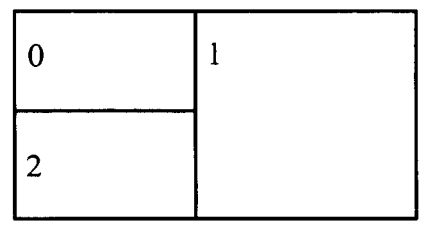
FIG. 2B is a schematic diagram of three-picture mode of terminal display according to an embodiment of the present invention.
Figure 2C:
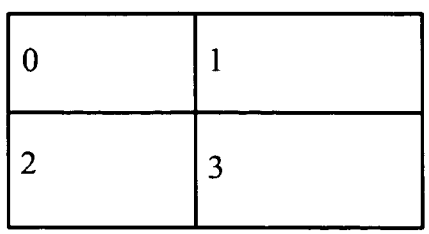
FIG. 2C is a schematic diagram of four-picture mode of terminal display according to an embodiment of the present invention.
Figure 2D:
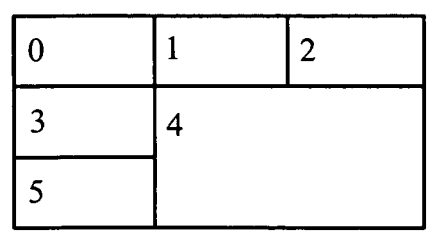
FIG. 2D is a schematic diagram of six-picture mode of terminal display according to an embodiment of the present invention.

Suppose the product used in the videoconference system of the embodiment supports four modes of multi-picture, as shown in FIGS. 2A, 2B, 2C, and 2D; wherein the numeral at top left corner of each sub-picture is the sub-picture number of the sub-picture; the multi-picture mode used in the current videoconference system is six-picture mode, as shown in FIG. 2D.

Figure 3:
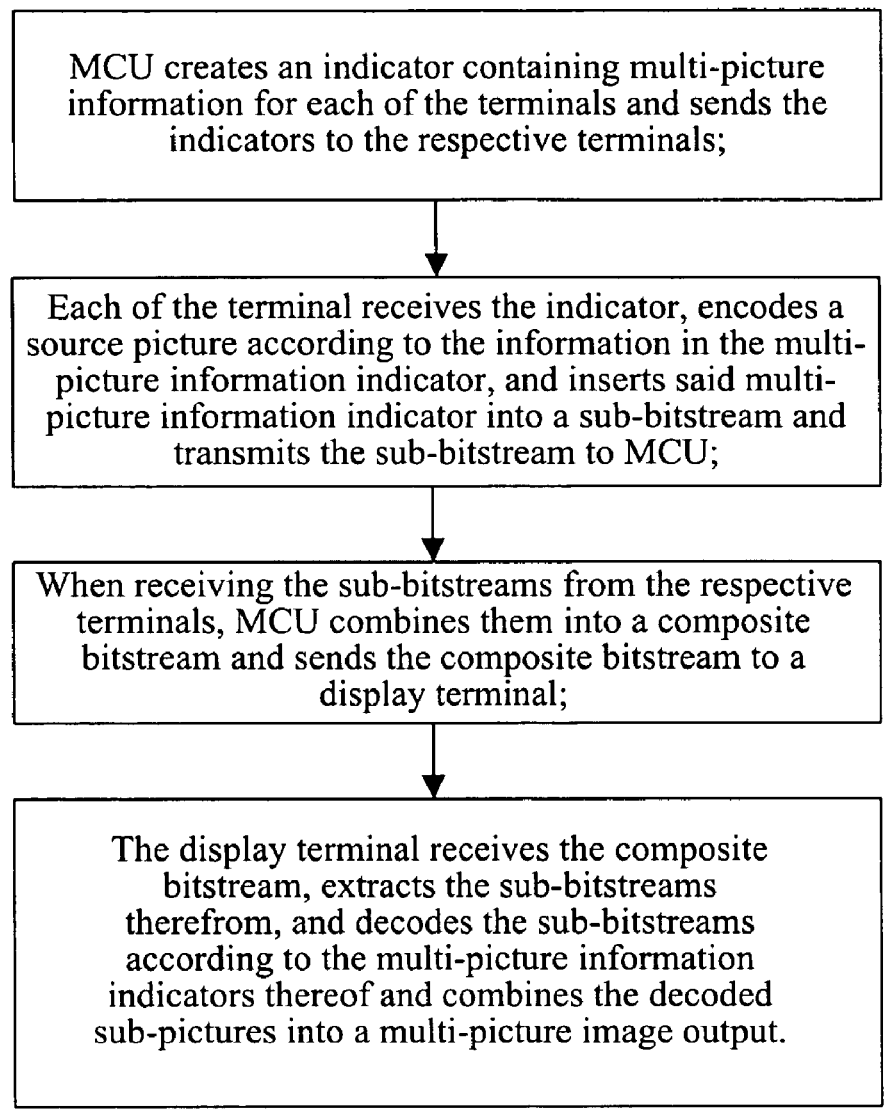
FIG. 3 is a flow chart of the method according to an embodiment of the present invention.

As shown in FIG. 3, a method of realizing multi-picture on the basis of extended CPM syntax in the embodiment of the present invention includes the following steps:

First, the MCU generates an ESBI containing information of multi-picture mode and positions, dimensions, and formats of sub-pictures for each terminal and sends the ESBI to each of the terminals.

Before the multi-picture video conference begins, the specific content of ESBI has to be determined. As the present product only supports four multi-picture modes, two bits in the bit field of ESBI can be provided to represent the multi-picture modes; since the maximum sub-picture number is 5, represented with "101" in binary system, three bits in the bit field of ESBI can be provided to represent sub-picture numbers; the maximum sub-picture number that can be represented with three bits is 7.

Figure 4:
FIG. 4 is a schematic diagram of byte division for the bit field in the ESBI according to an embodiment of the present invention.

Thus, the bit field of ESBI has a total length of 5 bits. The byte division for the bit field of ESBI in the embodiment is shown in FIG. 4.

Wherein the two bits for multi-picture modes can be designated as follows:

"00" represents two-picture mode;
"01" represents three-picture mode;
"10" represents four-picture mode;
"11" represents six-picture mode.

The case of three bits for sub-picture numbers is much more complex. The three bits shall be used in conjunction with the multi-picture modes, so as to determine the display position, dimensions, and format of a specific sub-picture. When the current multi-picture mode is six-picture mode i.e. the bit field for multi-picture modes is "11" and the multi-picture is in Common Intermediate Format (CIF), with resolution as (352×288), the bit field for sub-picture numbers is defined as follows:

"000" indicates the display position of the sub-picture is ((0, 0)) and the format of the sub-picture is (CIF, 120×96);

"001" indicates the display position of the sub-picture is ((120, 0)) and the format of the sub-picture is (CIF, 112×96);

"010" indicates the display position of the sub-picture is ((232, 0)) and the format of the sub-picture is (CIF, 120×96);

"011" indicates the display position of the sub-picture is ((0, 96)) and the format of the sub-picture is (CIF, 120×96);

"100" indicates the display position of the sub-picture is ((120, 96)) and the format of the sub-picture is (CIF, 232×192);

"101" indicates the display position of the sub-picture is ((0, 192)) and the format of the sub-picture is (CIF, 120×96);

"110" and "111" indicate Null.

the MCU sends the above 5-bit long ESBIs to each of the terminals; those ESBIs are unique; the ESBIs obtained by the respective terminals are:

Terminal 1: ("11, 000"); terminal 2: ("11, 001"); terminal 3: ("11, 010"); terminal 4: ("11, 011"); terminal 5: ("11, 100"); terminal 6: ("11, 101").

Second, each of the terminals receives the ESBI, encodes its source picture depending on the information of dimensions and format for sub-picture contained in the ESBI, and then inserts the ESBI into a sub-bitstream and sends the sub-bitstream to the MCU.

To take terminal 1 for example, when receiving the ESBI "11, 000", terminal 1 scales its source picture to picture of 120×96 pixels and encodes the scaled picture into sub-bitstream 1 depending on the dimensions and format for sub-picture "(CIF, 120×96)" contained in the ESBI, and inserts the ESBI into the picture header and the GOB header of the sub-bitstream 1, supposing that the MCU combines the sub-bitstreams in units of GOBs.

The cases of other terminals are similar to the case of terminal 1.

Third, when receiving the sub-bitstreams from the respective terminals, the MCU combines the sub-bitstreams into a composite bitstream and sends the composite bitstream to a display terminal.

When receiving sub-bitstream 1-6 from the six terminals, the MCU need not decode the sub-bitstreams; instead, the MCU combines the sub-bitstreams into a composite bitstream in units of GOBs, and sends the composite bitstream to the display terminal.

Fourth, the display terminal receives the composite bitstream, extracts the respective sub-bitstreams from the composite bitstream, obtains the current multi-picture mode, positions and formats of the sub-pictures depending on the ESBIs of the respective sub-bitstreams, decodes the sub-bitstreams, and combines the decoded multiple sub-pictures into a required multi-picture output.

When receiving the composite bitstream, the display terminal extracts the respective sub-bitstreams in units of GOBs and parses out the ESBIs of the respective sub-bitstreams; for example, for sub-bitstream 1, ESBI "11, 000" is parsed out from sub-bitstream 1 and thereby the current multi-picture mode of six-picture mode, the position of "(0, 0)" and the format of "(CIF, 120×96)" of sub-picture 0 corresponding to sub-bitstream 1 are obtained. [58] The display terminal continues to accomplish decoding of the sub-bitstream 1-6, obtains the corresponding sub-pictures 0-5, and combines the decoded sub-pictures into the multi-picture output display as shown in FIG. 2D.

In the above embodiment, the 5-bit length of ESBI and the designated meanings of the respective bytes in ESBI are only for illustration purpose, and shall not be deemed as constituting any limitation to the protected scope of the present invention.

The method described in the present invention is also applicable to other standards including H.261, H.264, and MPEG-4 etc.; therefore, the embodiments provided in the descriptions shall not be deemed as constituting any limitation to the protected scope of the present invention.

The invention claimed is:

1. A method of realizing multi-picture, comprising the following steps:
    A. a Multipoint Control Unit creating an indicator containing multi-picture information for each of the terminals and sending the indicator to each of the terminals;
    B. each of the terminals receiving said indicator, encoding a source picture depending on the information in the multi-picture information indicator, and inserting said multi-picture information indicator into a sub-bitstream and transmitting the sub-bitstream to the Multipoint Control Unit;
    C. when receiving the sub-bitstreams from the respective terminals, the Multipoint Control Unit combining the sub-bitstreams into a composite bitstream and sending the composite bitstream to a display terminal;
    D. the display terminal receiving the composite bitstream, extracting the sub-bitstreams from the composite bitstream, decoding the sub-bitstreams depending on the multi-picture information indicator of the sub-bitstreams, and combining the decoded sub-pictures into a multi-picture output.

2. The method of realizing multi-picture as in claim 1, wherein said multi-picture information indicator refers to an ESBI that contains the information of multi-picture mode and positions, dimensions, and formats of sub-pictures.

3. The method of realizing multi-picture as in claim 2, wherein said ESBI is longer than two bits.

4. The method of implementing multi-picture as in claim 1, wherein the encoding of the source pictures according the information in the multi-picture information indicator in said step B specifically refers to encoding the source picture depending on the dimensions and format of the sub-picture contained in the multi-picture information indicator.

5. The method of realizing multi-picture as in claim 1, wherein the inserting of the ESBI into the sub-bitstream in said step B more specifically refers to that:
    when the Multipoint Control Unit combines the sub-bitstreams in units of frames, the ESBI is inserted into a picture header of the sub-bitstream;
    when the Multipoint Control Unit combines the sub-bitstreams in units of GOBs, the ESBI is inserted into both the picture header and a GOB header of the sub-bitstream;
    when the Multipoint Control Unit combines the sub-bitstreams in units of Slices, the ESBI is inserted into both the picture header and a Slice header of the sub-bitstream.

6. The method of realizing multi-picture as in claim 1, wherein the combining into the composite bitstream in said step C more specifically refers to combining into the composite bitstream in units of frames, GOBs, or Slices.

7. The method of realizing multi-picture as in claim 1, wherein the extracting the respective sub-bitstreams from the composite bitstream in said step D refers to extracting the sub-bitstreams from the composite bitstream in units of frames, GOBs, or Slices.

8. The method of realizing multi-picture on the basis of CPM syntax as in claim 1, wherein the dependence on the multi-picture information indicators of the respective sub-bitstreams in said step D more specifically refers to that:
    when the Multipoint Control Unit combines the sub-bitstreams in units of frames, it is depending on the multi-picture information indicator in the picture headers of the sub-bitstreams;
    when the Multipoint Control Unit combines the sub-bitstreams in units of GOBs, it is depending on the multi-picture information indicator in the picture headers and the GOB headers of the sub-bitstreams;
    when the Multipoint Control Unit combines the sub-bitstreams in units of Slices, it is depending on the multi-picture information indicators in the picture headers and the Slice headers of the sub-bitstreams.

\* \* \* \* \*